United States Patent [19]

Wang

[11] Patent Number: 5,054,856
[45] Date of Patent: Oct. 8, 1991

[54] HEADREST OF A CAR SEAT

[76] Inventor: Chuan M. Wang, No. 3, Alley 12, Lane 188, Ton Nan St., Hsinchu, Taiwan

[21] Appl. No.: 538,014

[22] Filed: Jun. 13, 1990

[51] Int. Cl.[5] .............................................. A47C 7/36
[52] U.S. Cl. .................................... 297/408; 297/409
[58] Field of Search ................ 297/408, 403, 293, 409

[56] References Cited

U.S. PATENT DOCUMENTS

| | | | |
|---|---|---|---|
| 4,674,797 | 6/1987 | Tateyama | 297/408 |
| 4,678,232 | 7/1987 | Ishida et al. | 297/408 |
| 4,798,415 | 1/1989 | Tanino et al. | 297/408 |
| 4,830,434 | 5/1989 | Ishida et al. | 297/408 |

FOREIGN PATENT DOCUMENTS 3131597 10/1981 Fed. Rep. of Germany ...... 297/403

Primary Examiner—Kenneth J. Dorner
Assistant Examiner—Cassandra L. Hope
Attorney, Agent, or Firm—Morton J. Rosenberg; David I. Klein

[57] ABSTRACT

The present invention relates to an improved headrest of a car seat, and more particularly to a headrest of a car seat which includes a base member mounted on back of the car seat with an adjustable control mechanism provided in hollow legs of the base member and a head member connected with a beam of the control mechanism. In this manner the headrest is positionally and/or angularly adjustable to suit all tastes.

1 Claim, 7 Drawing Sheets

HEADREST OF A CAR SEAT

BACKGROUND OF THE INVENTION

The present invention relates to an improved headrest of a car seat and more particularly is directed to a headrest of a car seat which is positionally and/or angularly adjustable at the discretion of the user.

In prior art headrests for car seats, the headrests are generally fixed to the back of the car seat and are adjustable only in a longitudinal direction along the back of the car seat. Prior art headrests cannot be angularly adjusted at the discretion of the user. Since persons have different statures and comfort areas, the adjustability of the subject headrest allows for increased comfort by users.

SUMMARY OF THE INVENTION

It is the purpose of the present invention to mitigate and/or obviate the above-mentioned drawbacks and disadvantages in the manner set forth in the Description of the Preferred Embodiment.

The primary purpose of the present invention is to provide a seat of a car with an adjustable headrest which can be positionally and/or angularly adjusted.

Another purpose of the present invention is to provide an improved headrest of a car seat, the adjustment of which is easy and convenient to use and can be individually adjusted.

A further purpose of the present invention is to provide a car seat with an adjustable headrest which suits a wide variety of user tastes.

Further objectives and advantages of the present invention will become apparent in the following Description and the features of novelty are provided in the Claims annexed to and forming a part of this invention.

DESCRIPTION OF THE PREFERRED EMBODIMENTS

The following is a detailed description of the best presently contemplated embodiment of the invention. The following description is not to be taken in a limiting sense, but is made merely for the purpose of illustrating the general principles of the invention.

Figure 1:
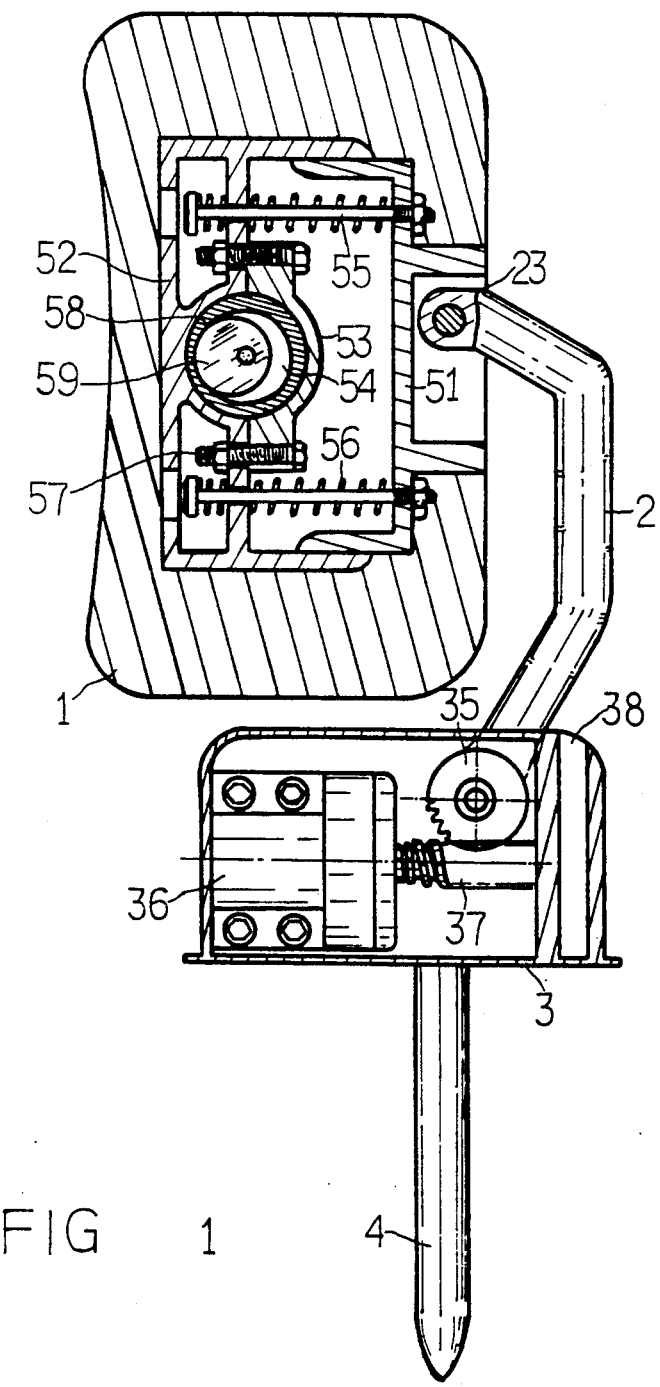
FIG. 1 is a perspective view of the subject headrest in accordance with the present invention.
Figure 2:
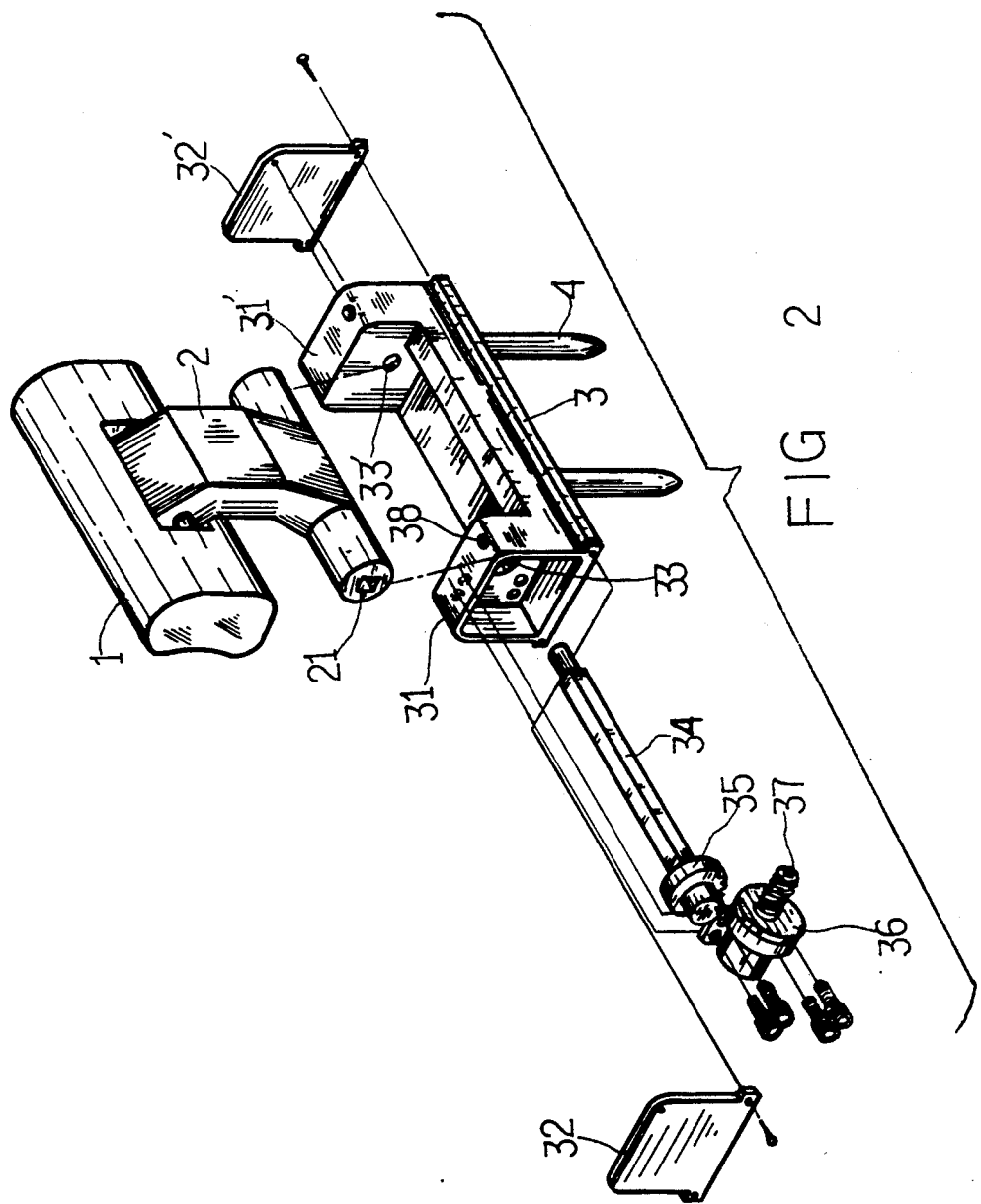
FIG. 2 is an exploded perspective view of the subject headrest in accordance with the present invention.
Figure 3:
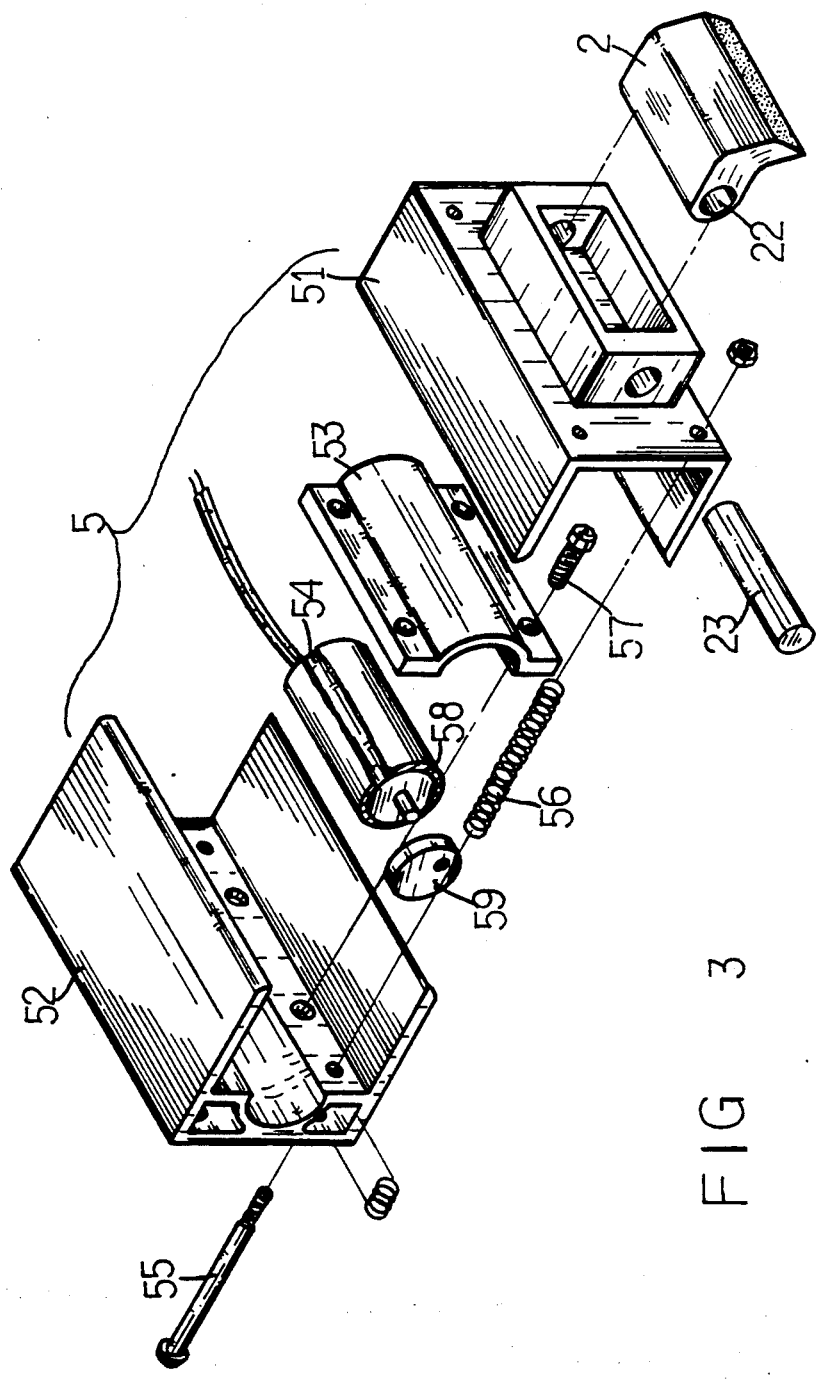
FIG. 3 is a plan view of a control mechanism for allowing inclination between a base member and a head member of the subject headrest according to a part of the present invention.
Figure 6:
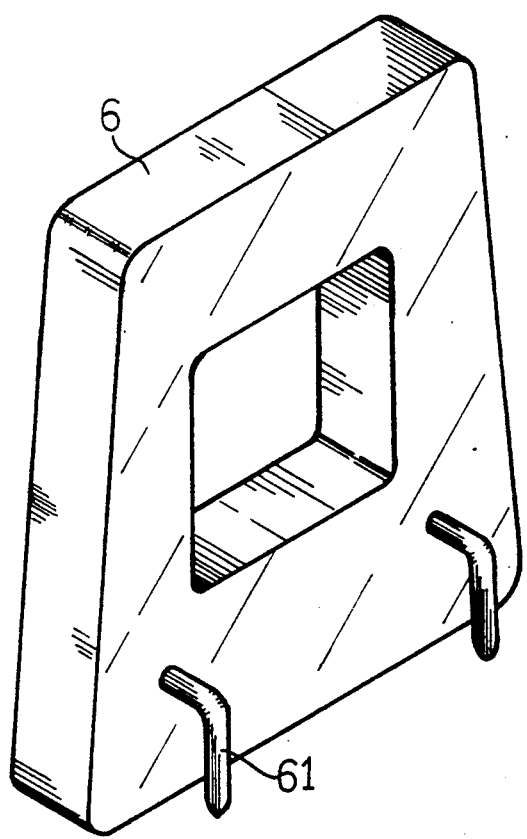
FIG. 6 is a plan view of a headrest in an angular adjustment position according to this invention; and, FIG. 7 is a plan view of a headrest in positional adjustment according to this invention.

Referring to FIGS. 1 and 2, the present invention includes a base member (1) and a head member (2) wherein the base member (1) is U-shaped having a pair of upstanding hollow leg members (11). Each of the two hollow leg members (11) are closed by threadedly securing respective plates (13) to respective hollow members (11), as is shown in FIG. 2. Two downwardly extending inserts (12) of the base member (1) are provided for insert into the back of a car seat. The base member (1) is therefore mounted on the back of the car seat. The head member (2) is connected to a support (21) by a pivot (24). The head member (2) can be slightly angularly adjusted as shown in FIG. 6 at the discretion of a user. The lower end of the support (21) connects to a laterally extending shaft (22) which has an axial rectangular opening or hole (23).

Figure 4:
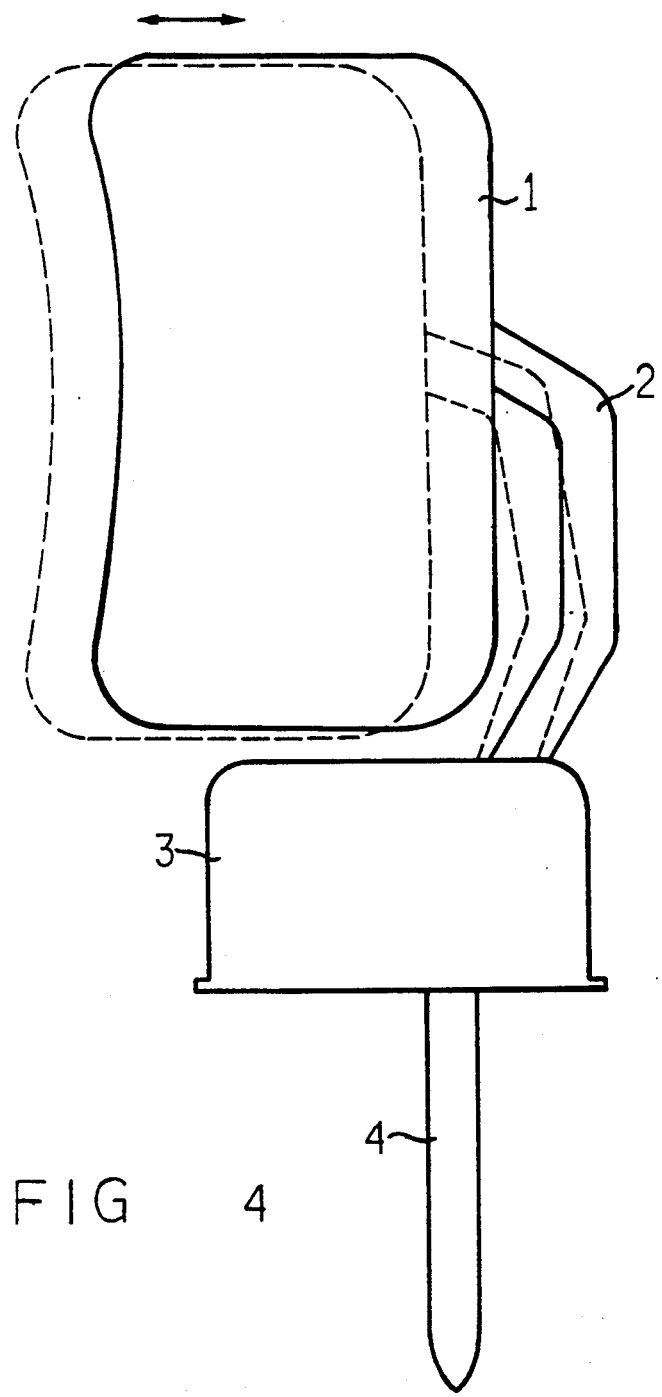
FIG. 4 is a plan view of gear teeth formed according to this invention.
Figure 5:
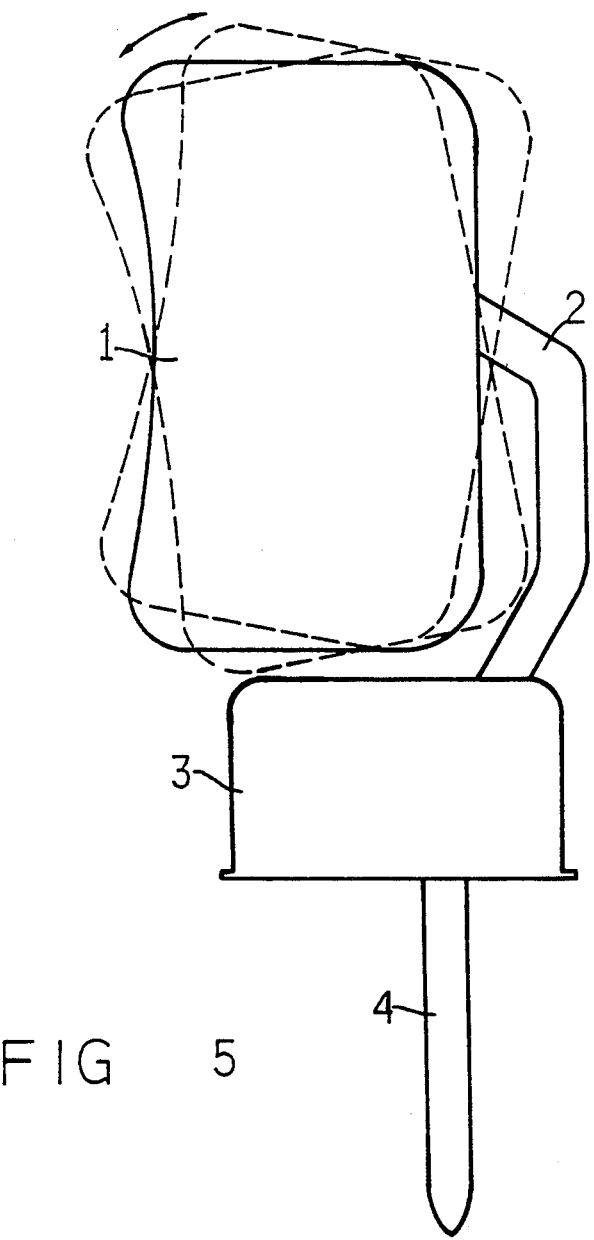
FIG. 5 is an enlarged cut-away plan view of FIG. 3 according to this invention.

A mechanism for controlling inclination between the base member (1) and the head member (2) includes a controller (3) and a lateral rectangular beam (31) which extends across the base member (1) and penetrates through the hole (23) of the shaft (22) to span the shaft as well as the head member (2). The suspended end of the beam (31) is positioned in one of the hollow leg members (11) of the base member (1) and is coupled to a fixed circular spring (4) which provides the beam (31) with a torquing bias force. The controller (3) is positioned in the other hollow leg (11) of the base member (1) and has an arched or arcuate surface with teeth (32). Referring to FIG. 4, the teeth (32) are separated into two sets of parallel intervals or rows. Two holding members (5) are pivoted about a pin (51) within one of the hollow legs (11) in side by side relation under the arched or arcuate surface of the controller (3) in relation to the sets of teeth (32) respectively. Each of the holding members (5) have an inclined concave surface (52) to be fitted or interfaced with the teeth (32) and are provided with a spring (53) under respective free ends to provide an upward biasing force, whereby the concave surface (52) can engage with one of the teeth (32). A control rod (6) pivots about a pillar (14) extending from the plate (13) and includes a lateral rod (6) extending over the free ends of the holding members (5). A coil spring (62) pivots about the pillar (14) to provide in an elastic manner an upward biasing force on the free ends of the control rods (6) to maintain such in an upwardly directed position.

Figure 7:
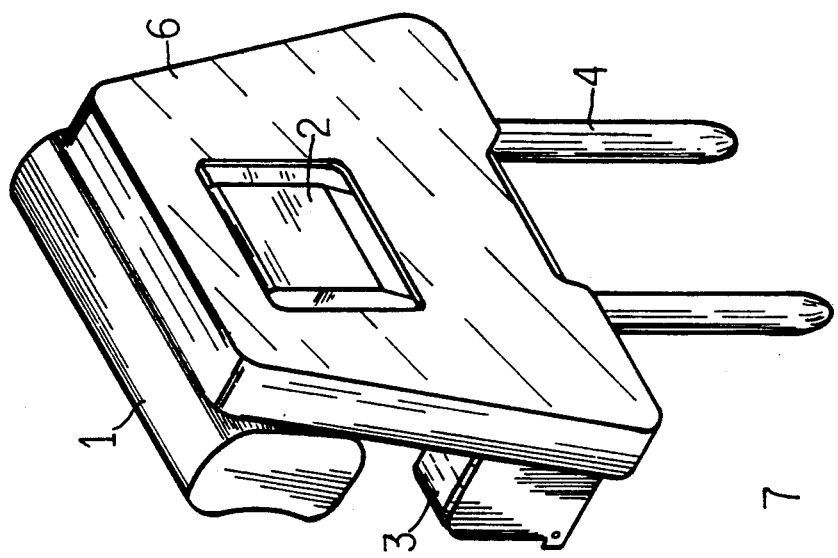

Accordingly, it will be understood that the spring (4) allows the beam (31) to rotate in a clockwise direction as shown in the FIG. 7, i.e., the head member (2) tends to move backwards, but is stopped because of the engagement between the convex surface (52) and engagement with teeth (32). In this embodiment, there is provided a one direction stop. The head member (2) is adjustable to be moved forwardly, whereby the only change is another tooth (32) engagement to the concave surface (52). The head member (2) may be adjusted to any desired position. This is to emphasize that two sets of teeth in relation to two holding members (5) provide for a finer fixed positional location. The user, by pressing down the control rod (6), allows the lateral rod (61) to press against the two holding members (5) and the engagement between the concave surface (52) and teeth (32) is released. The spring (4) biases the shaft (31) and the controller (8) to provide a rotational force in a counter-clockwise direction. The head member (2) may be adjusted backwardly, and can be slowly moved forward once again. The headrest thus allows for the primary purpose of adjusting the headrest of a car seat to suit the tastes of individual users in accordance with this invention.

As various possible embodiments might be made of the above invention without departing from the scope of the invention, it is to be understood that all matter herein described or shown in the accompanying drawings is to be interpreted as illustrative and not in a limiting sense. Thus, it will be appreciated that the drawings are exemplary of a preferred embodiment of the invention.

I claim:

1. An adjustable headrest of a car seat including a base member, a head member, and means for controlling inclination between said base member and said head member wherein the base member is U-shaped having a pair of upstanding hollow leg members, a pair of plates threadedly secured to each of the said hollow leg members, respectively leg members for providing enclosed chambers, a pair of inserts of the base member extending downwardly for insert into a back portion of a car seat;

the head member being connected to a support member by a pivot, whereby the head member is capable of angular adjustment at a user's discretion; a lower end of the support member is secured to a laterally extending shaft which has an axial rectangular hole;

said means for controlling inclination between said base member and said head member including a controller including a laterally extending rectangular beam which extends across the base member and penetrates through the hole of the shaft, one end of the beam being positioned in one of the hollow leg members of the base member and coupled to fixed circular spring which provides the beam a torque bias, the controller being located in the other hollow leg member and includes an arched surface with teeth, wherein said teeth being separated into two sets of parallel intervals;

a pair of holding members are pivoted about said hollow leg member containing said controller pivoted about a pin and are positioned under the arched surface of the controller in relation to two sets of teeth respectively, each of the holding members having an inclined concave surface to interface with the teeth, each of said holding members is provided with a spring under a free end thereof to provide an upwardly directed biasing force, whereby the concave surface is engageable with one of the teeth;

a control rod pivoting about a pillar extending from one of said plates and coupled to a lateral rod extending over the free ends of the holding members, and a coil spring pivoted about the pillar to provide a biasing force to maintain the control rod in an upwardly directed position.

* * * * *